(12) United States Patent
Das et al.

(10) Patent No.: US 9,135,535 B1
(45) Date of Patent: Sep. 15, 2015

(54) METHOD AND SYSTEM FOR PRORATING TRAPPING PARAMETERS GLOBALLY WITH RESPECT TO OBJECT SIZE

(71) Applicant: XEROX CORPORATION, Norwalk, CT (US)

(72) Inventors: Apurba Das, West Bengal (IN); Vijayabharathi Shetty, Karnataka (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/299,482

(22) Filed: Jun. 9, 2014

(51) Int. Cl.
*H04N 1/60* (2006.01)
*G06K 15/02* (2006.01)

(52) U.S. Cl.
CPC .................................. *G06K 15/1826* (2013.01)

(58) Field of Classification Search
None
See application file for complete search history.

(56) References Cited

U.S. PATENT DOCUMENTS

| | | | |
|---|---|---|---|
| 6,345,117 B2 * | 2/2002 | Klassen | 382/167 |
| 6,813,042 B2 * | 11/2004 | Hawksworth et al. | 358/1.9 |
| 7,139,098 B2 * | 11/2006 | Klassen | 358/1.9 |
| 7,146,043 B2 * | 12/2006 | McElvain | 382/167 |
| 7,196,816 B2 * | 3/2007 | Watanabe | 358/1.9 |
| 7,206,463 B2 * | 4/2007 | Nishide et al. | 382/298 |
| 7,271,934 B2 * | 9/2007 | McElvain | 358/1.9 |
| 7,391,536 B2 * | 6/2008 | McElvain | 358/1.9 |
| 7,522,313 B2 * | 4/2009 | Dalal et al. | 358/3.26 |
| 7,710,609 B2 * | 5/2010 | McElvain | 358/3.27 |
| 7,733,546 B2 * | 6/2010 | Yamada | 358/518 |
| 7,738,136 B1 * | 6/2010 | Dermer et al. | 358/1.4 |
| 7,940,420 B2 * | 5/2011 | Kurihara | 358/1.9 |
| 8,416,460 B2 * | 4/2013 | Eguchi | 358/3.26 |
| 8,675,257 B2 * | 3/2014 | Jia et al. | 358/2.1 |
| 2004/0201865 A1 * | 10/2004 | McElvain | 358/1.9 |

* cited by examiner

*Primary Examiner* — Dung Tran

(74) *Attorney, Agent, or Firm* — MH2 Technology Law Group LLP

(57) ABSTRACT

The present disclosure relates to a computer-implemented method, device, and computer-readable storage medium used to determine the prorating of trap color radius with respect to an object (text or graphics) size. The prorating of trap color radius allows for the problem of overpowering the trapping filter over the object size.

18 Claims, 8 Drawing Sheets

METHOD AND SYSTEM FOR PRORATING TRAPPING PARAMETERS GLOBALLY WITH RESPECT TO OBJECT SIZE

FIELD

One or more of the presently disclosed examples is related to trapping techniques to prevent visual gaps or overlaps between colors in printed/copied images.

BACKGROUND

In order to print a color image, a copier or printer separates the image into primary ink colors, such as cyan, magenta, yellow, and black (CMYK). The copier or printer then prints layers of the primary inks separately one on top of the other to reproduce the full variety of colors in the image. This process is known as process color separation.

During process color separation, the printer or copier must accurately register the boundaries between adjacent colored areas. Unfortunately, accurate registration of color separation boundaries is difficult. Mis-registration of boundaries between colors often results in undesirable defects, such as gaps or overlaps, in the printed image.

In addition to color mis-registration, other types of errors can also occur during color printing. For example, "halo" effect errors can appear in a printed image as a side-effect of the xerographic marking process. As the term implies, "halo" effect is where a halo (or gap) appears at the interface between two colored regions. Mis-registration and halo are examples of a general class of errors described as "adjacency errors" which affect the boundary regions of adjacent colors.

For example, FIG. 1 illustrates an image 100 and examples of how a copier or printer may reproduce it. As shown, image 100 includes a first colored square area 104 that is surrounded by a second colored area 102. Image 106 is one example resulting from an error in the colored areas in image 100. This error may be due to color mis-registration, halo effect error, or a combination of both. As shown, image 106 may include a halo effect error, which can be seen as a space or gap 108. As another example, image 110 includes a gap 112 and a dark overlap area 114 that has been caused by a color mis-registration error of colored area 104 relative to colored area 102.

Trapping is one technique that may be used to compensate for color mis-registration. In general, trapping parameters are designed to overcompensate for an error because gaps between colored areas are considered highly undesirable. Thus, in conventional trapping, the colored areas 102 and 104 are intentionally grown or expanded into each other to fill in any gaps, such as gaps 108 or 112. For example, image 116 illustrates how trapping may be used to compensate for color mis-registration error shown in image 110.

Unfortunately, conventional trapping causes its own side effects, such as dark colored area 118, to appear in image 116. These dark colored areas are also undesirable. However, as long as these dark colored areas can be minimized, they are considered preferable over gaps (e.g., areas 108 or 112) at least in the case of these darker colors.

Conventionally, trapping parameters are determined for use across a group or fleet of copiers or printers. Typical trapping parameters may account for variations that can exist across a fleet of printers or copiers. That is, a conventional trapping parameter will specify growth of a colored area in both directions along an axis, such as both left and right (or +/−x) and both up and down (or +/−y). This allows a trapping parameter to correct for errors in virtually any situation and direction. However, this conventional approach to trapping tends to overcompensate for errors and fails to minimize the side effects of trapping, such as dark areas 114 and 118.

SUMMARY

In implementations, a computer-implemented method for prorating trapping parameters is disclosed. The method can include dividing a object along a plurality of divisions in both a first scanning direction and a second scanning direction, wherein the plurality of divisions for both the first and the second scanning direction are bounded by the object such that no portion of the object is located outside of the plurality of divisions; obtaining a plurality of sampling points for the object in both the first scanning direction and the second scanning direction; determining a position coordinate of a centroid of the object based on the plurality of sampling points; determining a Euclidian distance of all cross-points from the plurality of sampling points to the centroid; selecting three points from the plurality of sampling points that have the highest Euclidian distance from the centroid; determining an average distance of each of the three points that were selected from the centroid; and determining whether to prorate the trapping parameters based on the average distance that was determined.

In implementations, the method can further include obtaining a requested trap width in both the first and the second scanning directions; and creating two arrays of trap widths based on the requested trap width that was obtained.

In implementations, the determining whether to prorate the trapping parameters can be based on twice the average distance that was determined.

In implementations, the first scanning direction is a fast scan direction and the second scanning direction is a slow scan direction.

In implementations, the object can be divided into between about 5 and about 15 equidistant portions.

In implementations, the plurality of sampling points can be between about 10 and about 30 sampling points.

In implementations, a device is disclosed that can include one or more processors; and a non-transitory computer readable medium comprising instructions that cause the one or more processors to perform a method for prorating trapping parameters. The method can comprise dividing a object along a plurality of divisions in both a first scanning direction and a second scanning direction, wherein the plurality of divisions for both the first and the second scanning direction are bounded by the object such that no portion of the object is located outside of the plurality of divisions; obtaining a plurality of sampling points for the object in both the first scanning direction and the second scanning direction; determining a position coordinate of a centroid of the object based on the plurality of sampling points; determining a Euclidian distance of all cross-points from the plurality of sampling points to the centroid; selecting three points from the plurality of sampling points that have the highest Euclidian distance from the centroid; determining an average distance of each of the three points that were selected from the centroid; and determining whether to prorate the trapping parameters based on the average distance that was determined.

In implementations, a non-transitory computer readable storage medium comprising instructions that cause one or more processors to perform a method for prorating trapping parameters is disclosed. The method can include dividing a object along a plurality of divisions in both a first scanning direction and a second scanning direction, wherein the plurality of divisions for both the first and the second scanning direction are bounded by the object such that no portion of the object is located outside of the plurality of divisions; obtaining a plurality of sampling points for the object in both the first scanning direction and the second scanning direction; determining a position coordinate of a centroid of the object based on the plurality of sampling points; determining a Euclidian distance of all cross-points from the plurality of sampling points to the centroid; selecting three points from the plurality of sampling points that have the highest Euclidian distance from the centroid; determining an average distance of each of the three points that were selected from the centroid; and determining whether to prorate the trapping parameters based on the average distance that was determined.

The present disclosure also provides a computer-readable medium which stores programmable instructions configured for being executed by at least one processor for performing the methods described herein according to the present disclosure. The computer-readable medium can include flash memory, CD-ROM, a hard drive, etc.

BRIEF DESCRIPTION OF THE DRAWINGS

Various embodiments of the present disclosure will be described herein below with reference to the figures wherein.

DETAILED DESCRIPTION

In the printing systems where the quality of printing is minutely examined, different types of object optimized rendering (OOR) filters (for example, trapping filters, anti-aliasing filters, etc.) may be employed to improve the image quality (IQ) of objects, for example, graphics, text, image object, jagging effect of curvy text, graphics, etc. As an example, to handle the problem of mis-registration, trapping filters may be used with a user defined trap width. The user defined trap width may not consider the size of the object the trap width is being applied to. If user selects a large width (for example, 20 pixels) for the complete document/page, the trap widths should be adaptive with respect to object size. In other words, the trap width should be prorated for smaller texts and graphics. If the trap width is not prorated, the trap color width becomes an overload to the object size and the printing quality is degraded. As discussed herein, the size of an object may be identified and measured in a calibrated way in order to provide an adaptive OOR filter. Thus, the trap width prorating may be performed based on the object size.

In conventional printing systems, the trapping filter generates a perceptually dominant third ($3^{rd}$) color of a specific user-defined trap-distance from the packed color-pair of object and background. If user selects a large radius (say 20 pixels) for the complete document/page, the trap distances should be adaptive with respect to object size. The trap radius should be prorated for smaller texts and graphics. Otherwise the wide trap color (a third color) would become an overload to the object size and the quality of printing would be degraded in terms of visible artifacts. In practice, the trap radius prorating is done by identifying the size of the object from the width (as extent in only fast scan direction) and height (as extent only in slow scan direction) of the object. The size is determined from the measure of perfect horizontal and vertical extent of the object and minima of these two measures. However this conventional approach often does not work well for tilted and non-orthogonally oriented objects, as well as, for regular objects where the results can be uneven trap with for similar size objects.

Figure 1:
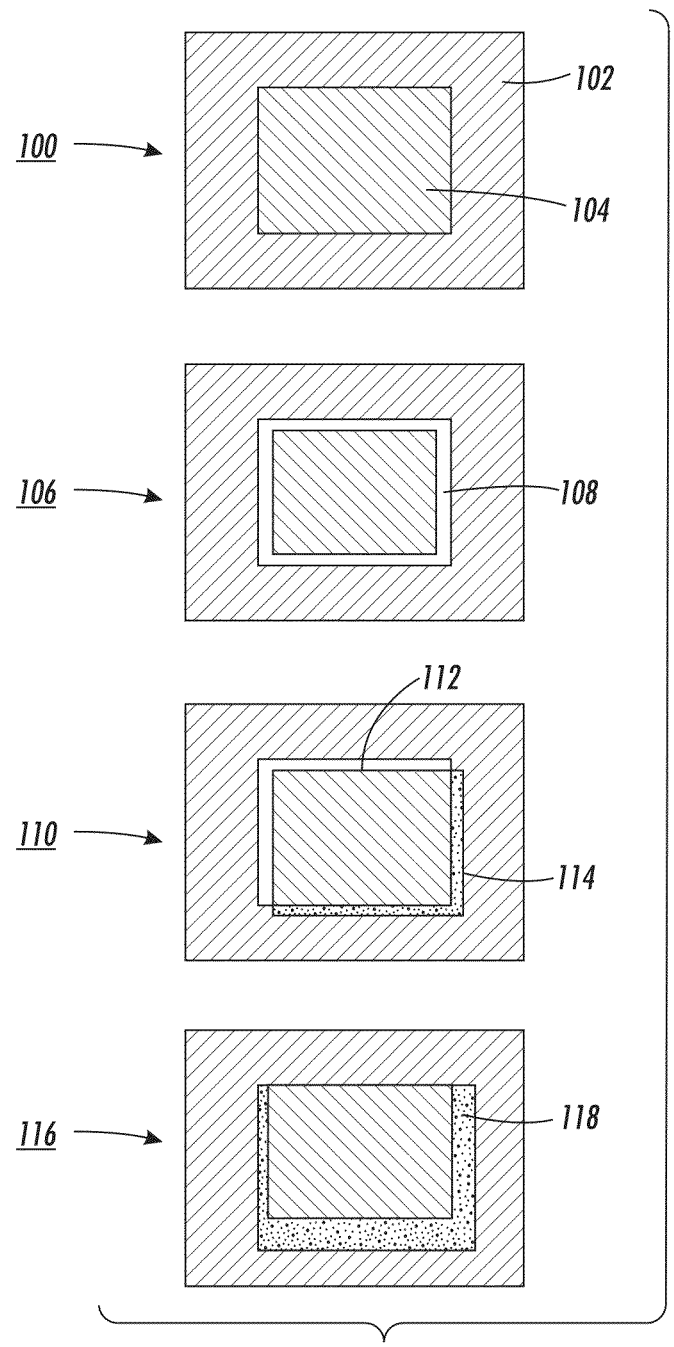
FIG. 1 illustrates an image and examples of how that image may be reproduced.
Figure 2:
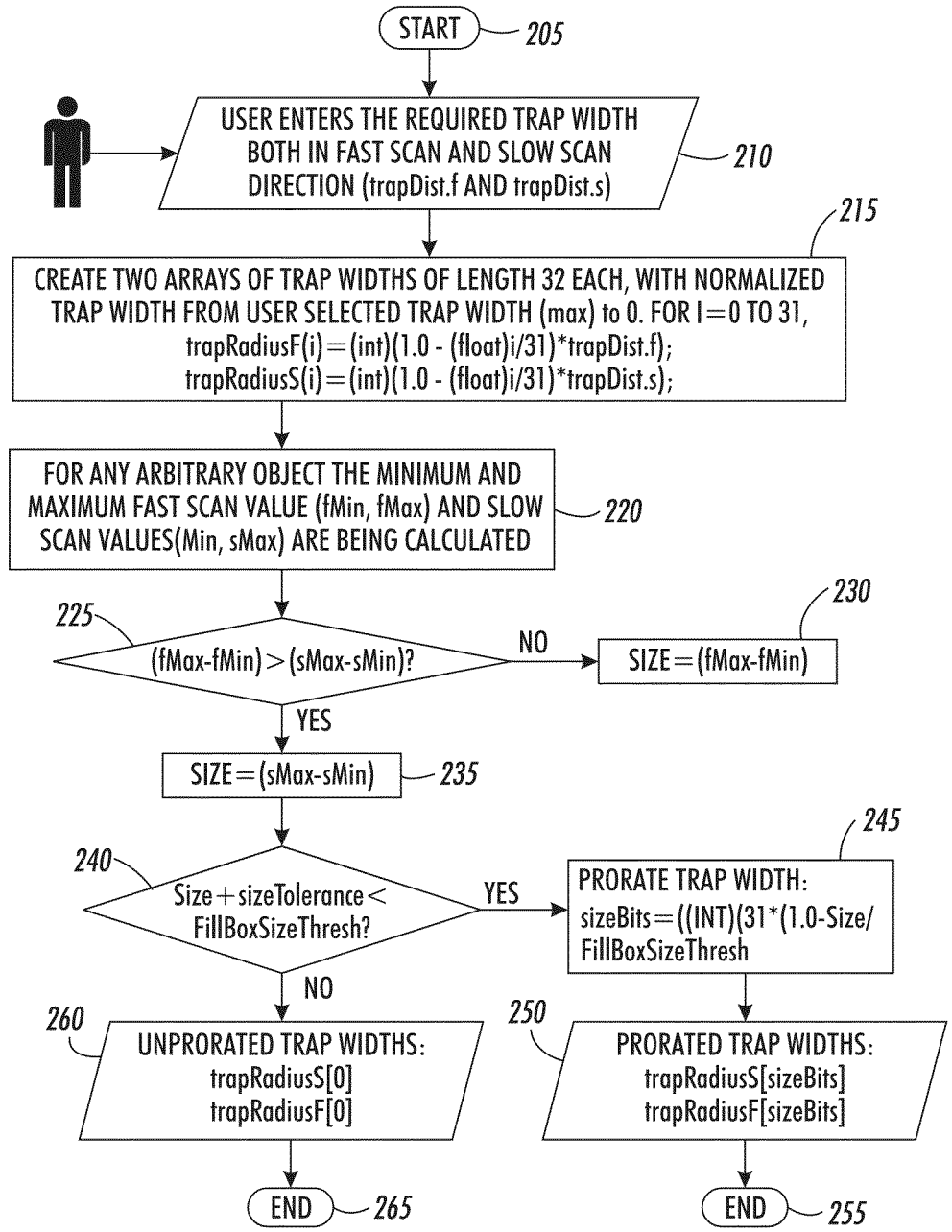
FIG. 2 illustrates a conventional algorithm in terms of a flow chart of prorating trap radius.

FIG. 2 illustrates a conventional algorithm in terms of a flow chart of prorating trap radius where a trap width can be determined based on a trap width defined by a user. At 205, the process begins. At 210, a user enters the required trap width both in the fast scan and the slow scan directions (trapDist.f and trapDist.s). At 215, two arrays of trap width of length 32 each are created with normalized trap width from user selected trap width (max) to 0. For i=0 to 31, trapRadiusF[i]=(int)(1.0−(float)i/31)*trapDist.f) and trapRadius[i]=(int)(1.0−(float)i/31*trapDist.s). At 220, for any arbitrary object the minimum and maximum fast scan value (fMin, fMax) and slow scan values (sMin, sMax) are being calculated. At determination is made at 225 as to whether (fMax−fMin) is greater than (sMax−sMin). If the determination at 225 is negative, then Size=(fMax−fMin) at 230. If the determination at 225 is positive, then Size=(sMax−sMin) at 235. At 240, a determination is made as to whether Size+sizeTolerance is less than FillBoxSizeThresh, where sizeTolerance is the tolerance allowed while measuring or calculating the size of the object and FillBoxSizeThresh is the threshold that determines whether the object size is small or big, or in other words, whether trap width should be prorated or not. If the result of the determination at 240 is positive, then prorate trap width: sizeBits=((INT)(31*(1.0−Size/FillBoxSizeThresh) at 245. At 250, prorated Trap widths: trapRadiusS[sizeBits] and trapRadiusF[sizeBits] and the process can end at 255. If the result of the determination at 240 is negative, then unprorated Trap widths: trapRadiousS[0] and trapRadiusF[0] at 260 and the process can end at 265.

Figure 3:
FIG. 3 illustrates a example image produced using the process of FIG. 2.

In the process of FIG. 2, the trapRadiusS[ ] and trapRadiusF[ ] arrays are filled with 32 trap radius starting from the user defined trap distance ($0^{th}$ index) to 0. The minima between perfectly horizontal and vertical extent (width and height) of the target object, size of the object is detected and the index of the array is modified accordingly. If the size (with a tolerance of 0.01) is less than a configuration setting threshold, then the prorating is done at 250, otherwise user defined un-prorated trap distances would be honored as trap radius at 260. FIG. 3 shows a test case using the conventional process of FIG. 2. As can be seen in FIG. 3, two rows of text are shown at different font sizes. In both the larger and smaller font size, the conventional process is not able to adequately handle the areas around the more narrow objects, such as the "i" in both rows, shown by 315.

Figure 4:
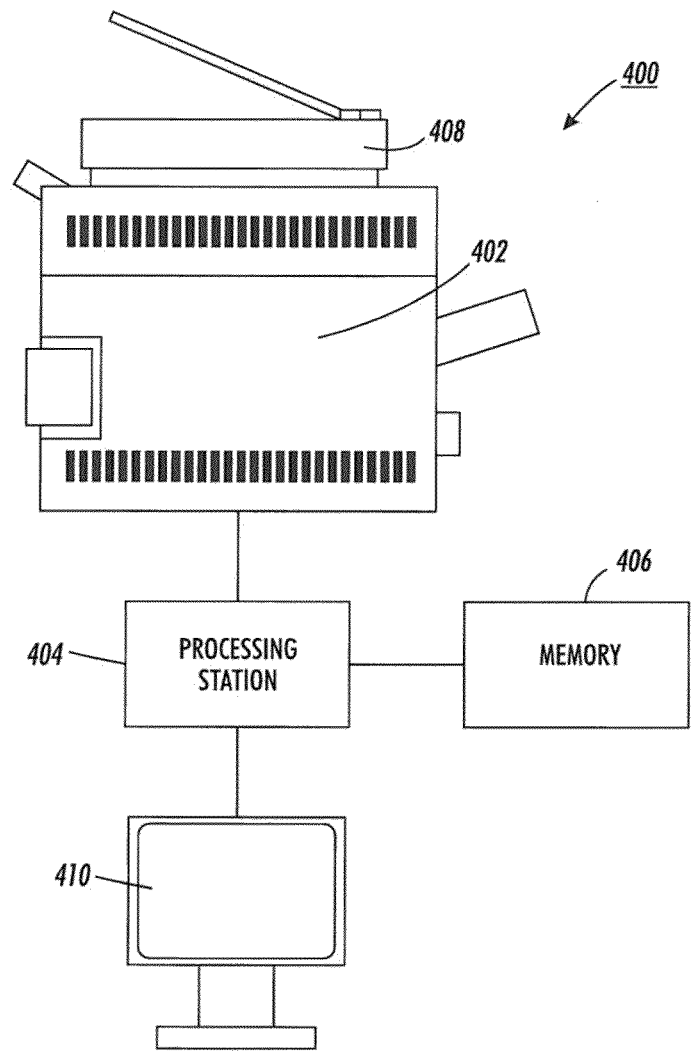
FIG. 4 illustrates an exemplary system that is consistent with some examples of the present disclosure.

FIG. 4 illustrates an example printing system 400 that is consistent with some examples of the present disclosure. For example, system 400 can be implemented as a xerographic printing or copying device. Accordingly, system 400 can print or copy a reproduction of an image in two or more colors. It may be appreciated that any type of printing or imaging device can be implemented in system 400.

System 400 may encode images based on either analog or digital representations of the image. For example, system 400 may encode images based on determining picture elements (i.e., "pixels") in each image. System 400 may determine pixels of an image by gathering data generated from a photo sensor cell when scanning a physical image. In some examples, system 400 obtains pixels of an image through line by line scanning of the image by one or more photosensitive elements, such as a multiple photo sensor array of charge couple devices (CCDs). System 400 can also receive or derive data and pixels of an image from a computer (not shown) that is executing a document creation application, such as Microsoft Word™, from a data storage device (not shown), or other applications. System 400 may be coupled to these devices, for example, via a network or some other communications channel.

System 400 may then reproduce the image onto a hardcopy medium by rendering the pixels of the image based on a variety of technologies, such as a laser, toner, or ink droplet. In some examples, system 400 may reproduce a color image based on a color separation process. For example, system 400 can use the well known CYMK color separation process. System 400 may also use other rendering techniques to reproduce or print an image, such as spot color separation.

The components of some examples of system 400 will now be described. As shown, system 400 may include a printing section 402, a processing station 404, a memory 406, a raster input section (RIS) 408, and a user interface 410.

Printing section 402 includes components of hardware and software that are used to print an image onto a hardcopy medium, such as paper, film, etc. For example, printing section 402 can be implemented as a digital color printer, a digital copier, digital press, an ink-jet printer, a xerographic printer, or other type of known printing or imaging device. As noted above, printing section 402 may use the well known CYMK color separation process in order to print color images. However, any type of printing process may be used by printing section 402.

Printing section 402 is implemented using well known components of hardware and software. In some examples, printing section 402 may suffer from color registration errors or halo effect errors when reproducing an image onto a hardcopy medium. For example, printing section 402 may have a color registration error that results in a gap or overlap between two regions of color in an image. As another example, printing section 402 may also suffer from halo effect errors. However, in various examples, printing section 402 or processing station 404 may compensate for these errors, either individually or collectively, based on trapping parameters that are determined in accordance with the principles of the present disclosure as discussed herein.

Processing station 404, utilizing one or more processors (not shown) manages and controls the operation of system 400. For example, processing station 404 may prepare image data that is to be output into hardcopy form by printing section 402. Processing station 404 can also create, modify, store, and/or otherwise process images, which will be output by printing section 402. In some examples, processing station 404 can include software, firmware, or hardware to perform trapping operations that account for the errors suffered in printing section 402 as discussed herein. Software and/or firmware may be stored, for example, in memory 406, or other memory (now shown). Memory storing the software and/or firmware may be implemented as storage device(s) that may comprise a combination of non-transitory, volatile or non-volatile memory such as random access memory (RAM) or read only memory (ROM). Such storage devices may be embodied using any currently known media such as magnetic or optical storage media including removable media such as floppy disks, compact discs, etc. One or more storage devices has stored thereon instructions that may be executed by the one or more processors, such that the processor(s) implement the functionality described herein. In addition, or alternatively, some or all of the software-implemented functionality of the processor(s) may be implemented using firmware and/or hardware devices such as application specific integrated circuits (ASICs), programmable logic arrays, state machines, etc.

For example, processing station 404 can be configured to determine whether a selected pixel includes multiple colors, determine the boundaries between color separations, and determine the colors present in the selected picture element. Processing station 404 may then determine whether a trapping operation should be performed to compensate for errors by printing section 402, and determine which trapping color should be used for the trapping operation.

In addition, processing station 404 can receive information about the position of a digital raster image and analyze its hardcopy produced by printing section 402 to determine the color registration error or halo effect error (if any) of printing section 402. Processing station 404 can be implemented using well known components and may be configured using any combination of software, firmware, and hardware.

Although FIG. 4 shows processing station 404 directly connected to the other components of system 400, processing station 404 may be indirectly coupled to the components of system 400. For example, processing station 404 can include a communications device to facilitate information transfer to and from the components of system 400 and another computer or system. Processing station 404 may communicate with a remote diagnostic computer (not shown) to make an automatic service call in response to a detected problem.

Memory 406 serves as a storage area for system 400. For example, memory 406 can store one or more images having test patterns or test features that are printed by printing section 402 into hardcopy form. Memory 406 also provides storage for loading specific programs, such as diagnostic programs, and storage for data, such as machine history data, fault data, machine physical data, and specific machine identity information. In addition, memory 406 can store image quality analysis software that is executed by processing station 404 to analyze the printing accuracy of system 400.

Memory 406 can also store sets of tables that support trapping operations by system 400. These tables (not shown) can include stored color pairs corresponding to the colors that define the edge and a flag to indicate whether these pairs require trapping. For example, if a table entry has colors that need trapping, it can be marked as an entry in the table or through an auxiliary data structure, and one or more intermediate trapping color or colors can be indicated by these tables. In addition, the shape of the pixels along the edge that require a trapping color can be calculated or determined by using a table look-up from memory 406. Memory 406 may further store trap width information, for example, sets of trap widths, used for processing as more fully discussed below.

Raster input section (RIS) 408 forms a digital raster image from a hardcopy sample or document and feeds the digital raster image to printing section 402. In some examples, RIS 408 captures an image, converts it to a series of raster scan lines, and measures a set of primary color densities, i.e., red, green, and blue densities, at each point of a document. Accordingly, in some examples, RIS 408 can obtain data from a hardcopy test image that indicates the printing accuracy of system 400 and printing section 402.

RIS 408 can be implemented using known components, such as document illumination lamps, optics, a mechanical scanning drive, and a charge coupled device (CCD) array or full width scanning array, etc. For example, RIS 408 can be implemented as a flat bed scanner. RIS 408 may be coupled directly to the other components of system 400, such as printing section 402, for example, via a bus, or may be indirectly coupled to the other components of system 400, for example, via a network.

User interface 410 uses operating software stored in memory 406 to operate the various machine components in an integrated fashion to produce copies and prints. For example, user interface 410 can be coupled to processing station 404. In some examples, user interface 410 enables an operator to control and monitor various operator adjustable functions and maintenance activities of system 400. User interface 410 may further provide the user with a user interface to input information including trap width information in fast scan and/or slow scan directions for generating and/or applying trap width parameters as discussed herein. For example, user interface 410 can be a touch screen, or any other suitable control panel that permits control of the operation of printing section 402. User interface 410 can be any type of suitable visual display, such as a cathode ray tube (CRT), flat screen, etc.

It may be appreciated that FIG. 4 illustrates an example of system 400 as a digital copier machine. Other components of such a machine are well known to those skilled in the art, and thus, for the purpose of brevity, further detailed description thereof is unnecessary for these known components.

It should also be understood that a loosely coupled printing or reproducing system is also applicable for use with the examples described herein, such as a printer or facsimile device. Moreover, examples of the disclosure are also applicable to a printer used in conjunction with a stand-alone scanner, such as a flatbed type scanner.

Figure 5:
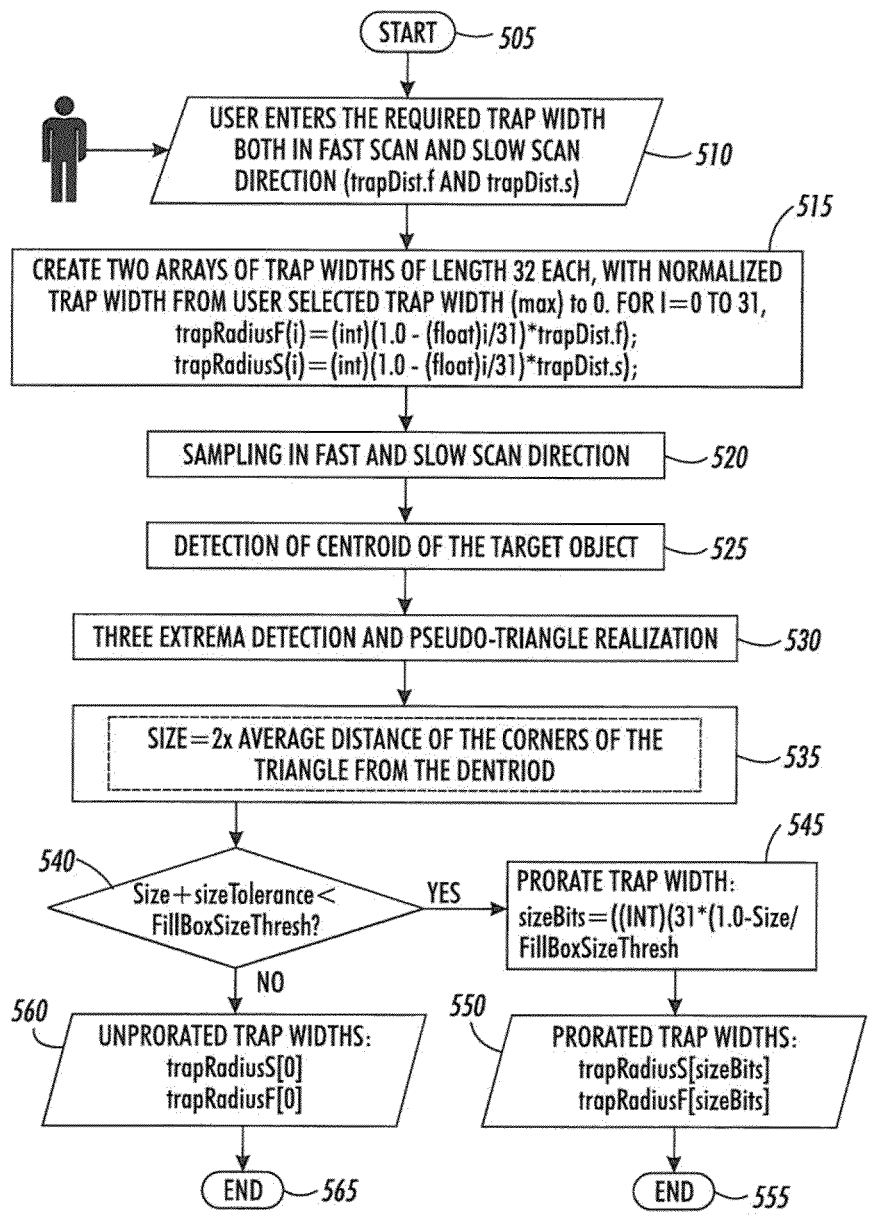
FIG. 5 illustrates an example process to determine trapping parameters in accordance with examples of the present disclosure.

FIG. 5 depicts an example process for determining trap parameters for an object according to embodiments. The process depicted in FIG. 5 may be performed, for example, by processing station 404.

The process begins in a similar manner to that described above in FIG. 2. At 505, the process can begin. At 510, the trap width may be determined based on a trap width defined by a user, for example, via a user interface 410. The determined trap width may be, for example, in the form of a trap width in the fast scan (trapDist.f) and slow scan direction (trapDist.s). Multiple arrays of trap widths may be generated based on the determined trap width at 515. According to some examples, two arrays of trap widths of length 32 each, with normalized trap width from the determined trap width (max) to 0.

For i=0 to 31, trapRadiusF[i]=(int)(1.0−(float)i/31)*trapDist.f); and trapRadiusS[i]=(int)(1.0−(float)i/31)*trapDist.s).

Figure 6A:
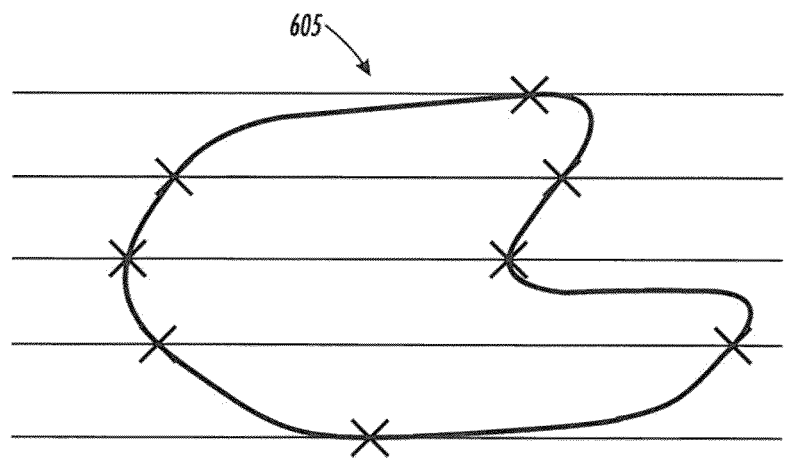
FIGS. 6A and 6B illustrate an example vertical and horizontal object sampling technique, respectively, in accordance with examples of the present disclosure.
Figure 6B:
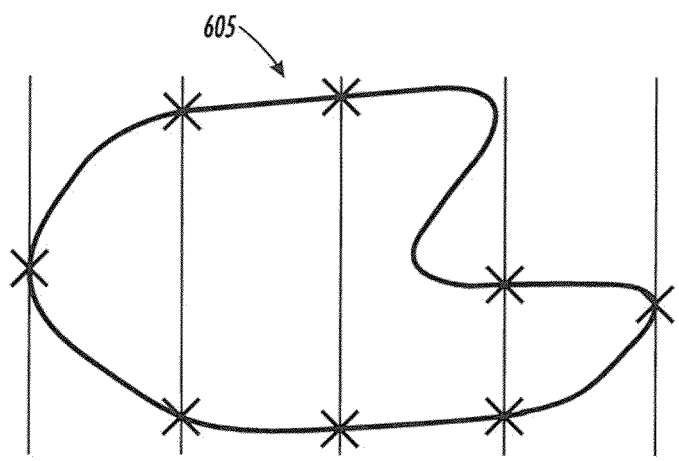

At 520, after detecting the minimum and maximum values in the fast and the slow scan direction in terms of fMin, fMax, sMin, and sMax, the target object is sampled in multiple divisions in both the fast and slow scan directions. FIGS. 6A and 6B show an example sampling technique for an irregular asymmetric target object 605 where 5 equidistant samples in a fast scan and slow scan direction, respectively. Although FIGS. 6A and 6B show the target object 605 divided into 5 divisions, the target object 605 can be divided into a finer number of portions. In some embodiments, the target object can be sampled using 10 divisions. For 10 point sampling, 20 points are objected from the target object 605 in both the fast and slow scan directions. Other sampling divisions can also be used.

At 525, a centroid of the target object 605 is determined. Based on the points objected during the sampling, the position coordinate ($\overline{X}$, $\overline{Y}$) of the centroid would be $$\overline{X} = \frac{\sum_{i=1}^{L-1} fScan_i}{L}, \text{ and}$$

$$\overline{Y} = \frac{\sum_{i=1}^{L-1} sScan_i}{L}$$

where L/2 is the number of samples, which is 10 in the example of FIG. 6, but L can be increased for better accuracy.

At 530, three extrema points of the target object are determined from centroid. After determining the position coordinate of the three extrema points, the Euclidian distances of all cross-points are calculated from centroid. After the distance of the sampled points are measured from the centroid, the highest three distances are selected to be used in 535.

At 535, from the three extrema points that were determined, the average distance for each of the three extrema points is determined. The double of the average is then considered as the size of the object.

The process can then proceed in a similar manner that was described in FIG. 2 at 240, 245, 250, 255, 260, and 265. In particular, at 540, a determination is made as to whether Size (two times the average distance of the corners of a triangle from by the extrema points from the centroid)+sizeTolerance is less than FillBoxSizeThresh. If the result of the determination at 540 is positive, then prorate trap width: sizeBits= ((INT)(31*(1.0−Size/FillBoxSizeThresh) at 545. At 550, prorated trap widths are then set at: trapRadiusS[sizeBits] and trapRadiusF[sizeBits] and the process can end at 555. If the result of the determination at 540 is negative, then unprorated trap widths are set at: trapRadiousS[0] and trapRadiusF[0] at 560 and the process can end at 565.

Figure 7:
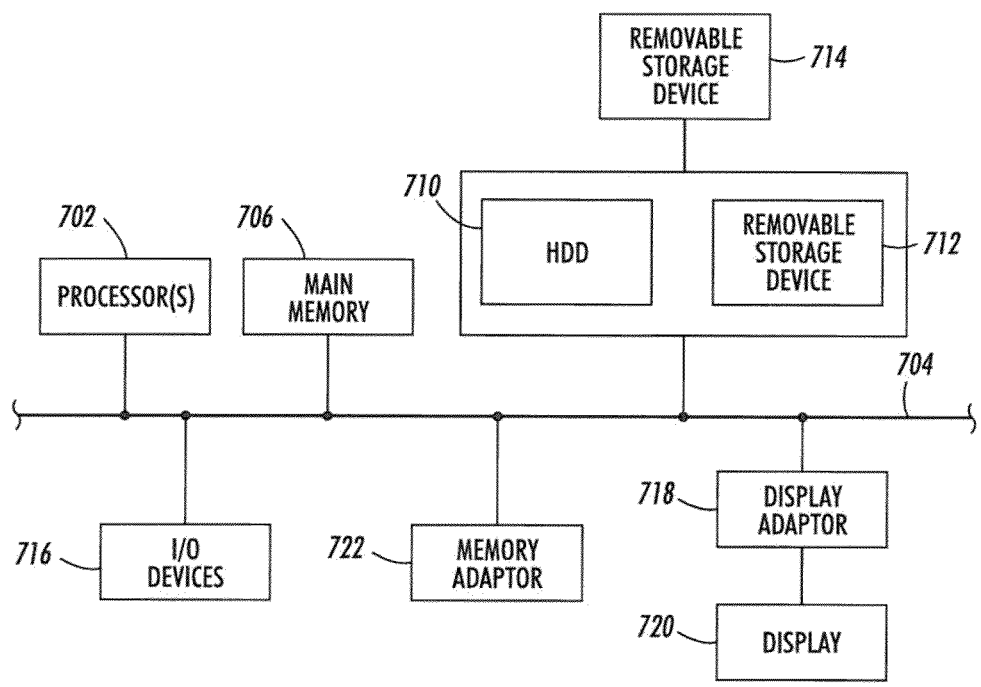
FIG. 7 illustrates an example computing device, in accordance with examples of the present disclosure.

FIG. 7 illustrates a block diagram of some components of an example computing apparatus 700, such as the processing station 404 and memory 406 depicted in FIG. 4, according to an example. In this respect, the computing apparatus 700 may be used as a platform for executing one or more of the functions described hereinabove.

The computing apparatus 700 includes one or more processors 702. The processor(s) 702 may be used to execute some or all of the steps described in the method depicted in FIG. 5 and among other places in this specification. The processor(s) 602 may be of varying core configurations and clock frequencies. Commands and data from the processor(s) 702 are communicated over a communication bus 704. The computing apparatus 700 also includes a main memory 706, such as a random access memory (RAM), where the program code for the processor(s) 702, may be executed during runtime, and a secondary memory 708. The secondary memory 708 may includes, for example, one or more hard disk drives 710 and/or a removable storage drive 712, representing a floppy diskette drive, a magnetic tape drive, a compact disk drive, etc., where a copy of the program code in the form of non-transitory computer-readable or machine-readable instructions to perform the method depicted in FIG. 5 may be stored. The storage device(s) as discussed herein may comprise a combination of non-transitory, volatile or nonvolatile memory such as random access memory (RAM) or read only memory (ROM).

The removable storage drive 710 may read from and/or writes to a removable storage unit 714 in a well-known manner. User input and output devices 716, as also shown, for example, in input device 410 in FIG. 4, may include a keyboard, a mouse, touchpad, touchscreen, a display, etc., for facilitating and enabling human interaction with and manipulation of computing apparatus 700. A display adaptor 718 may interface with the communication bus 704 and the display 720 and may receive display data from the processor(s) 702 and convert the display data into display commands for the display 720. In addition, according to some examples, the processor(s) 702 may communicate over a network, for instance, the Internet, LAN, etc., through a network adaptor 722. Network adaptor may be implemented as one or more network interfaces for communicating via one or more networks, such as Ethernet adapters, wireless transceivers, or serial network components, for communicating over wired or wireless media using protocols, such as Ethernet, wireless Ethernet, Global System for Mobile Communications (GSM), Enhanced Data rates for GSM Evolution (EDGE), Universal Mobile Telecommunications System (UMTS), Worldwide Interoperability for Microwave Access (WiMAX), Long Term Evolution (LTE), etc.

Examples described above can be performed as a computer applications or programs. The computer program can exist in a variety of forms both active and inactive. For example, the computer program can exist as one or more software programs, software modules, or both that can be comprised of program instructions in source code, object code, executable code or other formats; firmware program(s); or hardware description language (HDL) files. Any of the above can be embodied on a non-transitory computer medium, which include non-transitory computer readable storage devices and media, and signals, in compressed or uncompressed form. Example non-transitory computer readable storage devices and media include computer system RAM (random access memory), ROM (read-only memory), EPROM (erasable, programmable ROM), EEPROM (electrically erasable, programmable ROM), and magnetic or optical disks or tapes.

According to some examples, the components of computing apparatus 700 need not be enclosed within a single enclosure or even located in close proximity to one another. Those skilled in the art will appreciate that the above-described componentry are examples only, as computing apparatus 700 can include any type of hardware componentry, including any necessary accompanying firmware or software, for performing the disclosed embodiments. Computing apparatus 700 can also be implemented in part or in whole by electronic circuit components or processors, such as application-specific integrated circuits (ASICs) or field-programmable gate arrays (FPGAs).

Figure 8:
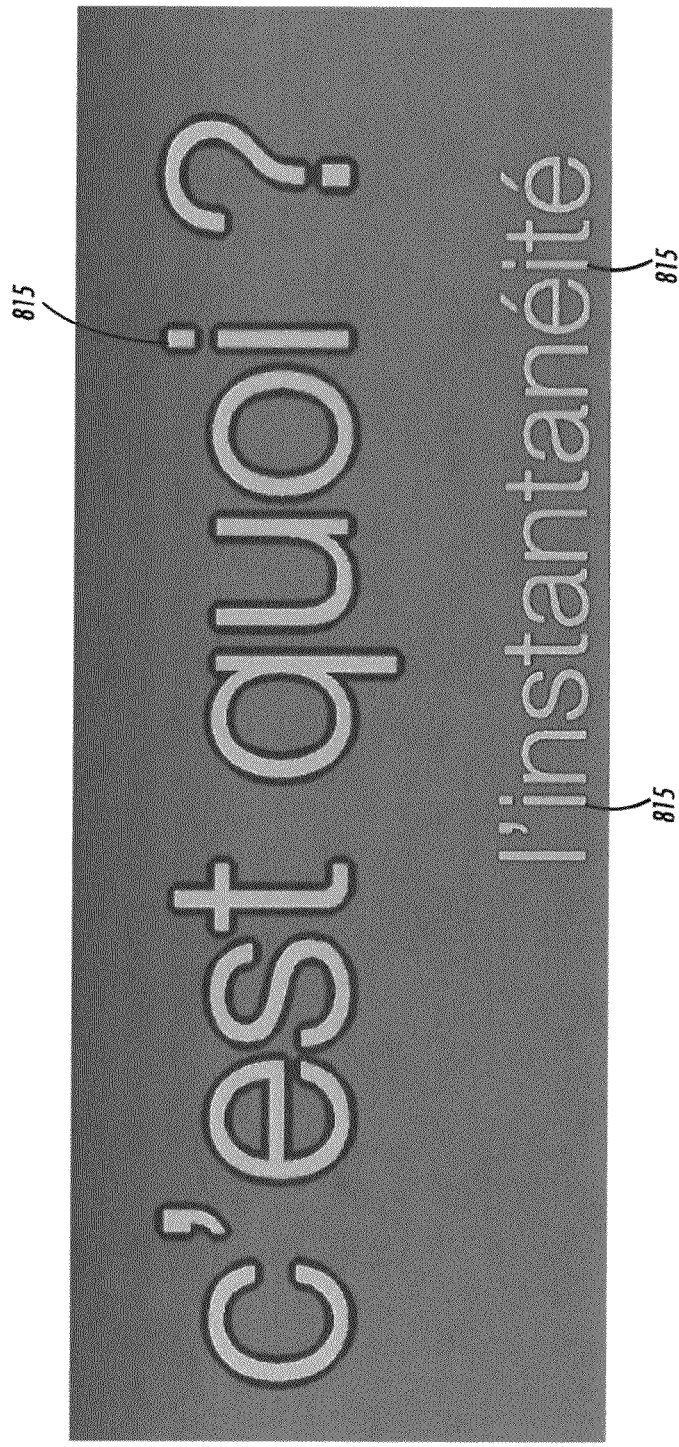
FIG. 8 illustrates a reproduced image, in accordance with examples of the present disclosure.

FIG. 8 depicts the same objects that were shown in FIG. 3 that is reproduced using the processes as discussed herein. As discussed in FIG. 3, as a uniform trap width is used throughout all portions of the object, including at 315, the image quality may be degraded where portions of the image are not of uniform thickness. In contrast, that same portion 815 in objects 805 and 810 shows improved image quality having a smaller trap width by calculating and applying prorated trap widths to those portions of the object having different thickness and sizes.

The foregoing descriptions have been presented for purposes of illustration and description. They are not exhaustive and do not limit the disclosed examples to the precise form disclosed. Modifications and variations are possible in light of the above teachings or may be acquired from practicing the disclosed examples. For example, the described implementation includes software, but the disclosed examples may be implemented as a combination of hardware and software or in firmware. Examples of hardware include computing or processing systems, including personal computers, servers, laptops, mainframes, micro-processors, and the like. Additionally, although disclosed aspects are described as being stored in a memory on a computer, one skilled in the art will appreciate that these aspects can also be stored on other types of computer-readable storage media, such as secondary storage devices, like hard disks, floppy disks, a CD-ROM, USB media, DVD, or other forms of RAM or ROM.

Other examples will be apparent to those skilled in the art from consideration of the specification and practice of the examples disclosed herein. The recitations in the claims are to be interpreted broadly based on the language employed in the claims and not limited to examples described in the present specification or during the prosecution of the application, which examples are to be construed non-exclusive. It is intended, therefore, that the specification and examples be considered as example(s) only, with a true scope and spirit being indicated by the following claims and their full scope equivalents.

While the teachings have been described with reference to the examples thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the terms "one or more of" and "at least one of" with respect to a listing of items such as, for example, A and B, means A alone, B alone, or A and B. Those skilled in the art will recognize that these and other variations are possible within the spirit and scope as defined in the following claims and their equivalents.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer-implemented method for prorating trapping parameters, the method comprising:

dividing an object along a plurality of divisions in both a first scanning direction and a second scanning direction, wherein the plurality of divisions for both the first and the second scanning direction are bounded by the object such that no portion of the object is located outside of the plurality of divisions;

obtaining a plurality of sampling points for the object in both the first scanning direction and the second scanning direction;

determining a position coordinate of a centroid of the object based on the plurality of sampling points;

determining a Euclidian distance of all cross-points from the plurality of sampling points to the centroid;

selecting three points from the plurality of sampling points that have the highest Euclidian distance from the centroid;

determining an average distance of each of the three points that were selected from the centroid; and determining whether to prorate the trapping parameters based on the average distance that was determined.

2. The computer-implemented method according to claim 1, further comprising:

obtaining a requested trap width in both the first and the second scanning directions; and creating two arrays of trap widths based on the requested trap width that was obtained.

3. The computer-implemented method according to claim 1, wherein the determining whether to prorate the trapping parameters is based on twice the average distance that was determined.

4. The computer-implemented method according to claim 1, wherein the first scanning direction is a fast scan direction and the second scanning direction is a slow scan direction.

5. The computer-implemented method according to claim 1, wherein the object is divided into between 5 and 15 equidistant portions.

6. The computer-implemented method according to claim 5, wherein the plurality of sampling points is between 10 and 30 sampling points.

7. A device comprising:

one or more processors; and a non-transitory computer readable medium comprising instructions that cause the one or more processors to perform a method for prorating trapping parameters, the method comprising:

dividing an object along a plurality of divisions in both a first scanning direction and a second scanning direction, wherein the plurality of divisions for both the first and the second scanning direction are bounded by the object such that no portion of the object is located outside of the plurality of divisions;

obtaining a plurality of sampling points for the object in both the first scanning direction and the second scanning direction;

determining a position coordinate of a centroid of the object based on the plurality of sampling points;

determining a Euclidian distance of all cross-points from the plurality of sampling points to the centroid;

selecting three points from the plurality of sampling points that have the highest Euclidian distance from the centroid;

determining an average distance of each of the three points that were selected from the centroid; and determining whether to prorate the trapping parameters based on the average distance that was determined.

8. The device according to claim 7, wherein the one or more processors are further operable to perform the method comprising:

obtaining a requested trap width in both the first and the second scanning directions; and creating two arrays of trap widths based on the requested trap width that was obtained.

9. The device according to claim 7, wherein the determining whether to prorate the trapping parameters is based on twice the average distance that was determined.

10. The device according to claim 7, wherein the first scanning direction is a fast scan direction and the second scanning direction is a slow scan direction.

11. The device according to claim 7, wherein the object is divided into between 5 and 15 equidistant portions.

12. The device according to claim 11, wherein the plurality of sampling points is between 10 and 30 sampling points.

13. A non-transitory computer readable storage medium comprising instructions that cause one or more processors to perform a method for prorating trapping parameters, the method comprising:

dividing an object along a plurality of divisions in both a first scanning direction and a second scanning direction, wherein the plurality of divisions for both the first and the second scanning direction are bounded by the object such that no portion of the object is located outside of the plurality of divisions;

obtaining a plurality of sampling points for the object in both the first scanning direction and the second scanning direction;

determining a position coordinate of a centroid of the object based on the plurality of sampling points;

determining a Euclidian distance of all cross-points from the plurality of sampling points to the centroid;

selecting three points from the plurality of sampling points that have the highest Euclidian distance from the centroid;

determining an average distance of each of the three points that were selected from the centroid; and determining whether to prorate the trapping parameters based on the average distance that was determined.

14. The non-transitory computer readable storage medium according to claim 13, further comprising:

obtaining a requested trap width in both the first and the second scanning directions; and creating two arrays of trap widths based on the requested trap width that was obtained.

15. The non-transitory computer readable storage medium according to claim 13, wherein the determining whether to prorate the trapping parameters is based on twice the average distance that was determined.

16. The non-transitory computer readable storage medium according to claim 13, wherein the first scanning direction is a fast scan direction and the second scanning direction is a slow scan direction.

17. The non-transitory computer readable storage medium according to claim 13, wherein the object is divided into between 5 and 15 equidistant portions.

18. The non-transitory computer readable storage medium according to claim 17, wherein the plurality of sampling points is between 10 and 30 sampling points.

* * * * *